(12) United States Patent
Zuili

(10) Patent No.: US 8,068,519 B2
(45) Date of Patent: Nov. 29, 2011

(54) METHOD AND SYSTEM TO USE, SHARE AND MANAGE DIGITAL CONTENT BY ASSIGNING MAC AND IP ADRESS TO EACH DEVICE AND PERIPHERAL

(75) Inventor: Patrick Zuili, Boca Raton, FL (US)

(73) Assignee: Britesmart LLC, Boca Raton, FL (US)

( * ) Notice: Subject to any disclaimer, the term of this patent is extended or adjusted under 35 U.S.C. 154(b) by 109 days.

(21) Appl. No.: 12/036,380

(22) Filed: Feb. 25, 2008

(65) Prior Publication Data
US 2009/0109980 A1    Apr. 30, 2009

Related U.S. Application Data

(63) Continuation-in-part of application No. 10/324,896, filed on Dec. 20, 2002, now Pat. No. 7,336,784.

(51) Int. Cl.
*H04J 99/00* (2009.01)

(52) U.S. Cl. ........ 370/546; 709/201; 709/202; 709/214; 709/217; 709/218; 709/224; 709/229; 709/249; 725/2; 725/4; 725/89; 725/100; 725/112; 713/193

(58) Field of Classification Search .................. None
See application file for complete search history.

(56) References Cited

U.S. PATENT DOCUMENTS

| | | | | |
|---|---|---|---|---|
| 5,341,425 A * | 8/1994 | Wasilewski et al. | .......... | 380/212 |
| 7,177,951 B1 * | 2/2007 | Dykeman et al. | ............. | 709/249 |
| 7,568,616 B2 * | 8/2009 | Zuili | ............................ | 235/382 |
| 2001/0003099 A1 * | 6/2001 | Von Kohorn | .................... | 463/40 |
| 2001/0012366 A1 * | 8/2001 | Van Rijnsoever et al. | ..... | 380/241 |
| 2001/0023429 A1 * | 9/2001 | Barker et al. | ................. | 709/203 |
| 2001/0029555 A1 * | 10/2001 | David | ............................ | 710/18 |
| 2002/0046180 A1 * | 4/2002 | Niwa | ............................. | 705/52 |
| 2002/0077177 A1 * | 6/2002 | Elliott | ............................ | 463/40 |
| 2002/0095574 A1 * | 7/2002 | Kori | ............................. | 713/170 |
| 2002/0188733 A1 * | 12/2002 | Collins et al. | ................. | 709/229 |
| 2002/0196939 A1 * | 12/2002 | Unger et al. | .................. | 380/216 |
| 2003/0093810 A1 * | 5/2003 | Taniguchi | ..................... | 725/112 |
| 2003/0109973 A1 * | 6/2003 | Hensey et al. | .................. | 701/35 |
| 2003/0140007 A1 * | 7/2003 | Kramer et al. | ................... | 705/40 |
| 2003/0145038 A1 * | 7/2003 | Bin Tariq et al. | ............. | 709/202 |
| 2003/0149989 A1 * | 8/2003 | Hunter et al. | ................... | 725/89 |
| 2003/0220111 A1 * | 11/2003 | Kang | ............................. | 455/445 |
| 2004/0031030 A1 * | 2/2004 | Kidder et al. | ................. | 717/172 |
| 2004/0148362 A1 * | 7/2004 | Friedman | ..................... | 709/217 |
| 2004/0225894 A1 * | 11/2004 | Colvin | ......................... | 713/200 |
| 2005/0021838 A1 * | 1/2005 | Levett | ........................... | 709/238 |
| 2006/0188327 A1 * | 8/2006 | Moon | ........................... | 403/325 |
| 2008/0082657 A1 * | 4/2008 | Hart et al. | ..................... | 709/224 |
| 2008/0148069 A1 * | 6/2008 | Tsuria et al. | ................... | 713/193 |
| 2008/0235108 A1 * | 9/2008 | Kulakowski et al. | ........... | 705/26 |

* cited by examiner

*Primary Examiner* — Hassan Phillips
*Assistant Examiner* — Ajay Cattungal

(57) ABSTRACT

The invention shows a method for connecting and sharing content over a plurality of devices, and over a plurality of networks public and private while respecting the content's Digital Rights by implementing a software layer (software alternately integrated into hardware component) that will assign a mac address and an ip address to each device and peripherals and where content can be assign to specific devices inside a network, and can be accessed directly, shared remotely, wireless, or physically connected. The software layer also integrates drivers, players, codec's that can be updated dynamically in order to keep them updated. This software layer can also "virtualizes" peripherals, devices or group of peripherals and devices into single addressable group of components that will act like one.

31 Claims, 3 Drawing Sheets

METHOD AND SYSTEM TO USE, SHARE AND MANAGE DIGITAL CONTENT BY ASSIGNING MAC AND IP ADRESS TO EACH DEVICE AND PERIPHERAL

This application is a continuation in part of patent application Ser. No. 10/324,896 filed Dec. 20, 2002, now U.S. Pat. No. 7,336,784 entitled as "VIDEO DECODER SYSTEM AND METHOD WITH ENHANCED DIGITAL RIGHTS MANAGEMENT (DRM)".

BACKGROUND OF THE INVENTION

1. Field of the Invention

This invention relates generally to sharing of digital content by network devices and, in particular, to network architecture of a digital audio/video distribution, while keeping and managing content digital rights.

2. Description of the Related Art

In today's current implementations of IP addressing, Mac addressing and overall networking implementations, IP address are assigned from the ISP usually based on the Mac address of the connected devices. The ability of assigning IP addresses is usually limited to networks devices. If we assume that a generic computer comprise one network card, one keyboard, one wireless network card, one mouse, one screen (monitor), multimedia sound card, . . . , each devices are addressed by both internal and external buses, where the internal bus connect all the internal components of a computer to the motherboard. This internal bus is a subsystem that transfers data between computer components inside a computer. This description applies from first to third bus generation, there is also another track that is integrated circuits being designed to allow devices on integrated circuits to talk to one another. In all cases network connections such as Ethernet are not generally regarded as buses, although this difference is largely conceptual than practical.

Typical existing network architecture is shown in FIG. 1. The Pay Per View (PPV) signal 102 is scrambled until the cable subscriber chooses to view the programming, at which time the subscriber contacts the provider 104 either by phone modem 106 in a set top box 110 or by interactive hand-held remote control to order a movie or event. Following the order, a computer 120 at billing subscriber management call center activates a video decoder/decryption system at the location of the subscriber that descrambles the ordered PPV program signal for the programs's duration. A smart card reader 122 may also facilitate decryption based on smartcard content 124. For example, the smart card may act as a cache memory for particular PPV transactions. In any case, the PPV purchases are totaled by the computer 120 and added to the cable subscriber's monthly bill.

What the need of the day is to assign ip address and mac address in a video/audio distribution system so as to enable them to share contents that is accessible to all the customers.

SUMMARY OF THE INVENTION

The invention shows a method for connecting and sharing content over a plurality of devices, and over a plurality of networks public and private while respecting the content's Digital Rights by implementing a software layer (software alternately integrated into hardware component) that will assign a mac address and an ip address to each device and peripherals and where content can be assign to specific devices inside a network, public or private and can be accessed directly, shared remotely, wireless, or physically connected. The software layer also integrate drivers, players, codec's that can be updated dynamically in order to keep them updated. The software layer can also be "virtualized" for peripherals, devices or group of peripherals and devices into single addressable group of components that will act like one.

This invention improves upon the prior art by providing an audio/video distribution system with enhanced digital rights management. The system, being configured for use with a source of programming, a third party responsible for authorization and an audio/video source encryptor and a receiver and authentication device disposed at a recipient location.

By assigning ip addresses and mac address to peripherals and internal components like hard drives and internal memory, keyboards, mouse, monitors, tv, sound cards . . . and have the ability to group these components together permit a wide range of applications and sharing capabilities while this layer integrate Digital right management capabilities in order to preserve the rights of the content owner during sharing.

Another aspect of the invention is also that due to the fact that content is transmitted using the electrical network, there is no need for a wide range of cables for delivering the signals and every connection becomes virtual and directly assignable.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
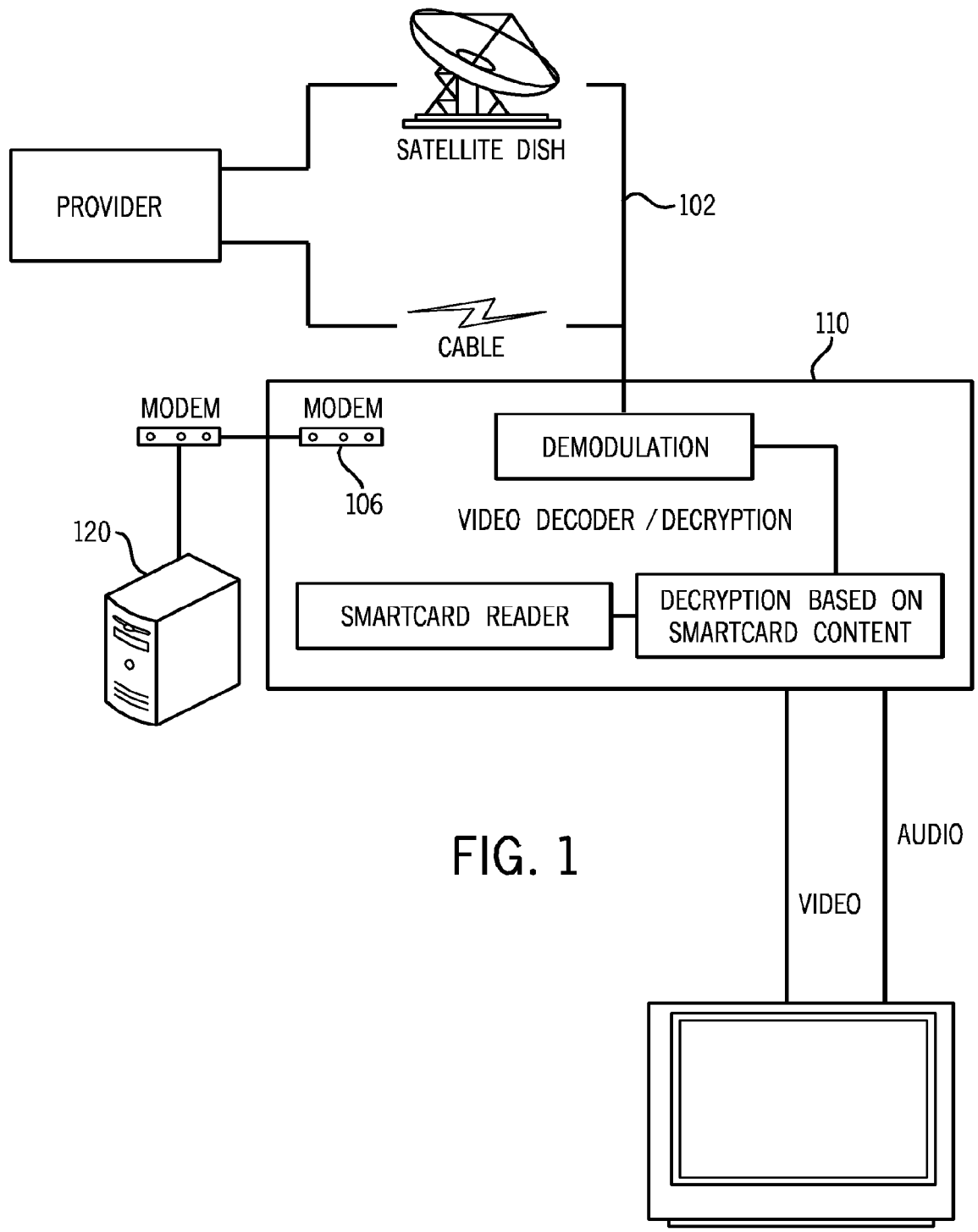
FIG. 1 is block diagram of a prior art network architecture application to the transmission of the audio video programming.
Figure 2:
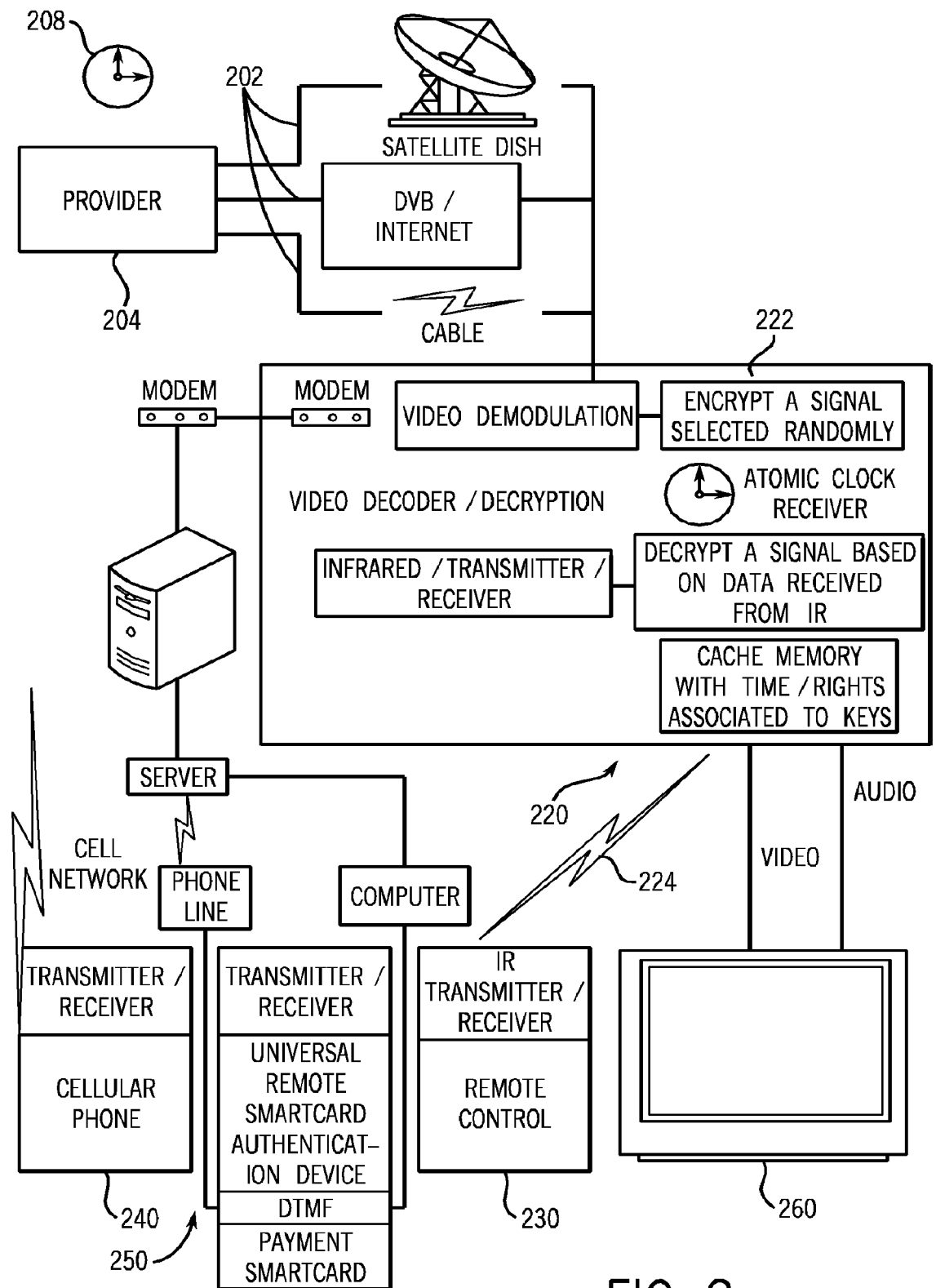
FIG. 2 is a block diagram of a typical audio/video distribution network that has an embedded rights management capability for enhanced security.

In broad and general terms, the invention merges different technologies to permit a more comprehensive content sharing methodology for broadcasting digital video, audio, and other signals that could benefit from enhanced rights management. For example FIG. 2 uses a satellite/cable network architecture based on a novel video/audio decoder according to the invention.

The signal(s) from a provider 204 are individually or globally 'wrapped' in a time envelope based upon a signal generated by an atomic clock 208. An embedded synchronization signal is also added, along with an optional interactive signal, all of which are encoded at the location of a subscriber. The interactive signal may be used to provide various types of data related to payment, delivery, advertising and so forth.

The decoder may receive signal from any existing or yet-to-be developed source, including cable, satellite, radio, DVD, DVB, satellite, digital networks and so on. In the preferred embodiment, the source signal is transmitted with missing content or some other critical aspect (such as audio, color, synchronization, reduced resolution, etc), such that even if the signal were backed at the receiving end, a desired signal would not be recovered. The "missing piece" is added at the receiving end as described in further detail below, and to further enhance security, decryption must take place at a specific time coordinated with the atomic clock (or satellite clock), such that an attempted unauthorized decryption at a later stage would not be possible.

A video decoder/decryption system 220 provides various functions at the subscriber location. In addition to the operations discussed above, the incoming signal is also encrypted once again, this time locally, thereby causing the received transmission to be unique to each receiver. This local encryption, which is on top of or overlays the already encrypted signal, may use a variety of techniques, both proprietary and standard, including public and private key cryptography. If the received signal is not already encrypted, the supplemental local encryption is likewise automatically disabled on the assumption that the transmission. Note further that the decoding and encryption/decryption capabilities provided by the system 200 are preferably implemented in the same circuit to further prevent tampering and hacking.

To decode the transmission for viewing, listening, playing, etc, the video decoder/decryption system 220 interacts with some form of authentication device, preferably using a wireless infrared signal 224. The authentication device may assume various forms according to the invention, including remote control or universal remote control 230, telephone or cellular phone 240, PDA or smartcard authentication device 250, ATM cards, and so forth. In each case, an authentication demand is transmitted indicating the desired channel, program, or other qualifying information. The demand may optionally include the key of the decoder.

If the decoder/decryption system is authorized (in accordance with the policy, rights and/or rules) an encrypted key is returned, thereby permitting signal decryption and time synchronization with the desired programming. Various modalities or protocols may be used for the communication between the decoder/decryption system 220 and authentication device, including compliance with the infrared data association (IRDA), dual tone, multi-frequency (DTMF), Bluetooth, and so forth. Communication may also occur between a smart card and the recipient equipment. In particular, the smart card may be used to store and relate the policy, rights and/or rules information.

The authentication signal provides the missing decryption information needed to permit the programming to be viewed on the display 260 (or listened to in the case of music, or interactivity in the case of games or software). The decoder receives the encrypted authentication signal from the appropriate device and validates the transaction, thereby allowing virtually any video/audio source signal to generate wireless information at a telephone, PDA, computers, X10, or other authentication device.

The system 220 may either receive the missing video and/or audio signals along with an embedded authentication signal (plus applicable policies, rights and/or rules), or the system may receive the authentication signal separately. In any case, this allows the broadcast signal to communicate additional information by way of remote controls, PDA, computer, X10, TV, video tape, amplifier and so forth. The subscriber may further optionally receive information such a payment authentication, advertising data, and so forth, via the telephone or other authentication devices including computers, the internet and the like. The system may accordingly be used to receive product information concerning advertising, payment information, and automatic memorization of phone numbers, on specifics products or services received in conjunction with the video/audio signal.

The authentication demand preferably includes a local random parameter plus a serial number based on hardware/software specifications derived from an algorithmic encryption function. The algorithmic encryption function performs a public key and/or a private key encryption, and then waits for the result to perform the decryption using IBE or classical PKI through the authentication device. Although known public/private encryption schemes are preferably used, the system is not limited in this regard, and may use a randomly selected color as opposed to a number. For example, video may be displayed with specific colors located on specific area on screen used to communicate digital information. A sensor (i.e. a CCD or photon phonon sensor with an infrared or other appropriate filter) may be coupled to infrared LED to receive a wide color wave range and translate this information into data and emit infrared data at destination of such devices. This arrangement of two sensors further helps to eliminate alteration due to brightness or saturation thanks to IR usage and recover error free any color signal emitted. This arrangement also permits any video signal to emit data information at destination of any appropriately equipped sensor device, independently of this invention.

The invention can also generate signals locally Dependant on composite data received, and emit these data to a sensor. The invention may also be used to generate IR signals to any device, to perform a payment or an authentication or policy, rights, rules update, in which case the device sends back signals that acknowledge the validation of the transmission. The signals are preferably encrypted in both directions PKI or Identity based encryption.

The authentication device send back an encrypted signal including the value needed to perform the decryption. This value is calculated in accordance with the received information and cryptographic formulas. The decoder system 220 receives the value in encrypted form, decrypts the value using the appropriate private key and implements this value to perform the decryption of the desired programming signal.

To avoid video or audio signal replication, each communication is serialized through the use of atomic time along with the encryption process. The decoder system 220 may incorporate its own atomic time receiver 222 or, as an alternative, atomic time may be embedded into the signal from the head end to simplify decoder electronics and reduce costs. The synchronization used by the decoder may further be randomized in accordance with a known time interval or other criteria to further increase signal complexity. As such, to replicate such decoding techniques, a broad knowledge of different technologies is necessary, thus effectively limiting the decoding to a person of extraordinary skill.

In terms of content protection, management rights and rules can be embedded into the various signals to permit broad control on the usage of the signals, including digital output, data duplication and control the usage of the feed once viewed. The decoder may further operate in conjunction with a separate video audio right management device, allowing or refusing duplication through the introduction of additional countermeasure to prevent and/or trace usage of the audio or video signals.

The system is applicable to various forms of programming, including video on demand, digital video broadcasting and Internet broadcasting, pay per view, video rental, ATM usage, and other areas. Moreover, since the decoder essentially functions as a payment terminal, unauthorized use now becomes a form of monetary fraud with stricter penalties.

To enhance tracing, the decoder system may add stamps to the video/audio signal, and the hardware of the decoder may be protected by a sensor to prevent opening by non-authorized personnel. Tampering or other attempted modifications may be recorded in memory (i.e. through EEPROM programming). To perform maintenance and support, however, the decoders may be opened by authorized individuals using a smartcard reader or other device to examine the recorded information.

Figure 3:
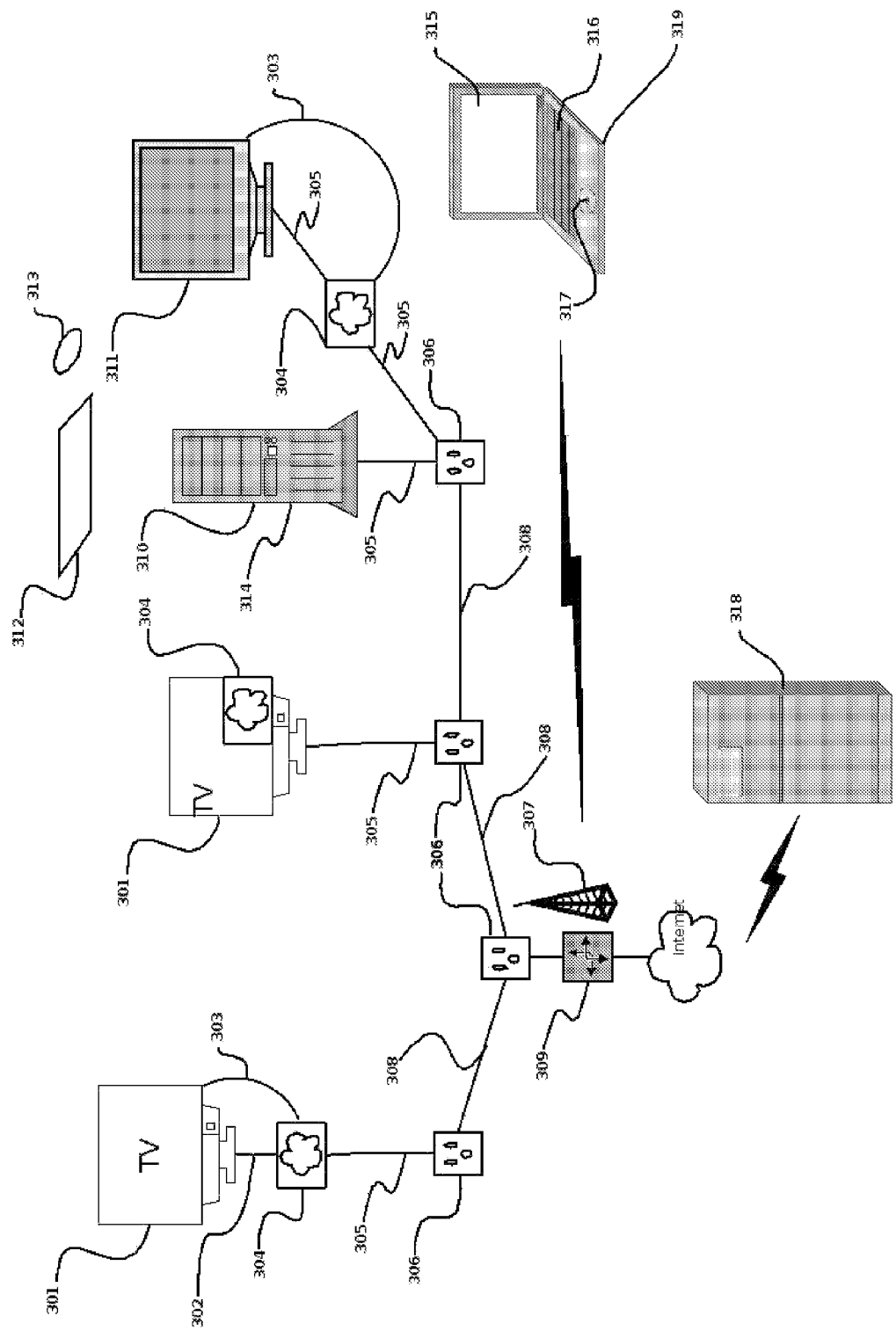
FIG. 3 is a block diagram in accordance with the present invention that shows plurality of network devices being assigned with Mac and IP addresses.

FIG. 3 depicts a block diagram in accordance with the present invention that shows plurality of network devices (301,310,311,312,313,315,316,317,319), being assigned with Mac and IP addresses. A very wider variety of devices can be shown in this network and also we can have private or public network. Further it depicts connecting and sharing content over a plurality of devices while respecting the Digital Rights of the content shared inside a network. Every device can be included, like TV, DVD, players, but also computer oriented devices like biometric readers as well as smartcards reader/writers even RFID devices. Whatever is the nature of the device can be shared in the network. In the cases where the device cannot be connected to a network, a small hardware will take care of signal translation from digital to analog and reversely, this device (304) will also get a network address, with the appropriate translation from private to public address.

In order to achieve such assignment of ip and mac address to the network devices, a software layer is implemented (314). The role of the software layer (314) is also to group the devices while respecting the Digital Rights of the content owner.

The plurality of devices connected through such a software layer offer content sharing and content access to the subscribers who now have variety of choice and quick access to the digital content.

The invention also make use of power system communications (304,309) capable of simultaneously transmitting and receiving multiple multiplexed digital data signals both at high rates and over long distances through power lines and power line transformers, including AC, DC, coaxial cables, and twisted pair lines.

While the foregoing is directed to embodiments of the present invention, other and further embodiments of the invention may be devised without departing from the basic scope thereof, and the scope thereof is determined by the claims that follow.

What is claimed is:

1. An audio and video content distribution system with enhanced digital rights management configured for use with a source of programming, such system comprising:
    a plurality of network devices having a memory, wherein the plurality of network devices are configured to store or pre-cache locally at least an assigned partial content of an original file adapted to be stored in the memory, and wherein a network device of the plurality of network devices includes at least one of a receiver, a sender or any combination thereof;
    at least a missing content of the original file adapted to be reassembled with the assigned partial content during a playback of the original file; and
    at least a software layer capable of assigning at least a Media Access Control (MAC) address and at least an Internet Protocol (IP) address to said network devices, peripherals, and internal components of the audio and video content distribution system,
    wherein the assigned partial content is capable of being accessed directly, remotely or shared between said network devices keeping intact the digital rights policies of the content owner,
    wherein during the playback of the original file at least one network device, digital rights management (DRM) are used to check the rights of the playback, and wherein each of the network devices reconstructs the original file using DRM with the assigned partial content and the missing content using the assigned MAC and IP address,
    wherein the software layer is capable of virtualizing the peripherals, the network devices, and groups of the peripherals and the network devices into single addressable group of components.

2. The audio and video content distribution system of claim 1, wherein the plurality of network devices are capable of being grouped together for the purpose of sharing the assigned partial content.

3. The audio and video content distribution system of claim 1, wherein peripherals and internal components include an internal memory, a keyboard, a mouse, a monitor, a television (TV), a sound card, a Digital Versatile Disc (DVD) read only memory (Rom), DVD random access memory (RAM), High Definition DVD including a Blue Ray player, a game station, a video projector and other such devices, or any combination of such devices thereof.

4. The audio and video content distribution system of claim 1, wherein the devices inside the network are dynamically assigned with the assigned partial content in order to virtualize shared and grouped devices.

5. The audio and video content distribution system of claim 1, wherein the software layer assigns the IP address and the MAC address to each network device including the digital rights usage policy for each network device while respecting the digital rights in the assigned partial content.

6. The audio and video content distribution system of claim 1, wherein the network includes at least one of a public network, a private network, a wireless network, a wired network, a multiplexed network using an electrical network system or any combination thereof.

7. The audio and video content distribution system of claim 1, wherein if a received signal is not already encrypted, supplemental local encryption is likewise automatically disabled on the assumption that the transmission is free.

8. The audio and video content distribution system of claim 1, wherein the network device is any device whether capable of being connected to a network or not.

9. The audio and video content distribution system of claim 1, wherein the assigned partial content is locally cached in order to facilitate streaming capabilities.

10. The audio and video content distribution system of claim 1, wherein the missing content is delivered upon payment validation by a third party when necessary.

11. The audio and video content distribution system of claim 1, wherein a plurality of codecs and players are dynamically updated at each network device location depending on the nature of the assigned partial content.

12. The audio and video content distribution system of claim 1, wherein the plurality of network devices include at least one of a source encryptor for transmitting the programming in encrypted form, a programming request device at a recipient location, a receiver at the recipient location, wherein the receiver further includes at least one of a decryptor, a decoder, a sensor, a processor or any combination thereof, wherein the processor is operative to perform several tasks on the missing content to output the programming to an audio and visual output device wherein the network devices at the recipient location are adapted to cache missing content of the original file.

13. The audio and video content distribution system of claim 12, wherein the source encryptor forms a part of a cable system, a satellite system, a radio system, a radio satellite system, a DVD system, a Digital Video Broadcasting (DVB) system, the Internet, a digital network or such other system.

14. The audio and video content distribution system of claim 12, wherein the transmission of the policies, rights, rules originates with at least one of the source encryptor, virtualized shared devices, virtualized group devices, the third party responsible for authorization or any combination thereof.

15. The audio and video content distribution system of claim 1 is capable of functioning as a payment system and a time-synchronized system.

16. The audio and video content distribution system of claim 12, wherein the decoder receives the encrypted authentication signal from the appropriate device and validates the transaction, thereby allowing virtually any audio and video source signal to generate wireless information at an authentication device, wherein the authentication device includes one of a remote control, a Personal digital Assistant (PDA), a computer, a X10, the TV, an IP TV, a video tape, an amplifier or any combination thereof.

17. The audio and video content distribution system of claim 12, wherein the decoder is capable of receiving signal from any existing or yet-to-be developed source including the cable system, the satellite system, the radio system, the radio satellite system, the DVD system, the DVB system, the Internet, the digital network or such other system.

18. The audio and video content distribution system of claim 12, wherein a source signal is transmitted with at least any one of a missing content, an audio, a color, a synchronization, a reduced resolution or any combination thereof such that even if the source signal were hacked at the receiving end a desired signal not entirely recovered.

19. The audio and video content distribution system of claim 12, wherein decryption takes place at a specific time coordinated with the atomic clock or a satellite clock to prevent an attempted unauthorized decryption at a later stage.

20. The audio and video content distribution system of claim 1, wherein an embedded synchronization signal is added along with an optional interactive signal, wherein the embedded synchronization signal and the optional interactive signal are encoded into the envelope at the time of transmission and decoded at the location of a subscriber, wherein the interactive signal is used to provide various types of data related to payment, content delivery, and advertising.

21. The audio and video content distribution system of claim 1, wherein a smart card reader is adapted to facilitate decryption based on smartcard content, wherein the smart card act as a cache memory for particular Pay Per View (PPV) and digital content transactions, wherein the PPV purchases are totaled by the computer and added to the cable subscriber's monthly bill.

22. The audio and video content distribution system of claim 1, wherein the missing content is always unique and different for each recipient even when the missing content is sent to a plurality of recipients.

23. The audio and video content distribution system of claim 1, wherein the assigned partial content is transmitted using a electrical network system such that every connection becomes virtual and directly assignable.

24. The audio and video content distribution system of claim 1 is capable of performing a plurality of operations including at least one of generating missing content locally dependant on composite data received and emit said received data to a sensor, using a randomly selected color, generating Infrared (IR) infrared signals to any device, sending back signals that acknowledge the validation of the transmission, wherein the missing contents are preferably encrypted either by public key infrastructure (PKI) or identity based encryption.

25. The audio and video content distribution system of claim 1 is capable of performing a plurality of operations including at least one of receiving advertising and product information, the payment processing, an authentication processing, a policy update, rights update, rules update or any combination thereof.

26. The audio and video content distribution system of claim 1, wherein at least a sensor is coupled to an infrared light-emitting diode (LED) to receive a wide color wave range and translate information related to the wide color wave range information into data and emit the infrared data at a destination of the network devices.

27. The audio and video content distribution system of claim 26, wherein the coupling of two sensors is adapted to eliminate alteration due to brightness or saturation, wherein the coupling sensors permits any video signal to emit data information at destination of any appropriately equipped sensor device independently.

28. The audio and video content distribution system of claim 12, wherein at least one of the decoding, encryption, and decryption capabilities or any combination thereof are preferably implemented in the same circuit to further prevent tampering and hacking.

29. The audio and video content distribution system of claim 1 is capable of receiving the missing content separately to allow a broadcast signal to communicate additional information by at least any one of a remote control, a PDA, a computer, a X10, a TV, an IP TV, a video tape, an amplifier or any combination thereof.

30. The audio and video content distribution system of claim 1, wherein the missing content is transmitted indicating the desired channel, program, or other qualifying information, wherein the demand is optionally include the key of the decoder.

31. The audio and video content distribution system of claim 1, wherein the missing content provides the missing decryption information needed to permit the programming to be viewed on the display, listened to in the case of music, interactivity in the case of games and software.

* * * * *